US012328754B2

(12) United States Patent
Liu

(10) Patent No.: US 12,328,754 B2
(45) Date of Patent: Jun. 10, 2025

(54) METHOD AND APPARATUS FOR CONFIGURING SYNCHRONIZATION SIGNAL AND PHYSICAL BROADCAST CHANNEL BLOCK, SYSTEM AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 567 days.

(21) Appl. No.: 17/433,828

(22) PCT Filed: Feb. 26, 2019

(86) PCT No.: PCT/CN2019/076156
§ 371 (c)(1),
(2) Date: Aug. 25, 2021

(87) PCT Pub. No.: WO2020/172793
PCT Pub. Date: Sep. 3, 2020

(65) Prior Publication Data
US 2022/0150957 A1 May 12, 2022

(51) Int. Cl.
*H04W 74/00* (2009.01)
*H04W 48/10* (2009.01)
*H04W 74/08* (2024.01)
*H04W 74/0808* (2024.01)

(52) U.S. Cl.
CPC ......... *H04W 74/006* (2013.01); *H04W 48/10* (2013.01); *H04W 74/0808* (2013.01)

(58) Field of Classification Search
CPC  H04W 74/006; H04W 48/10; H04W 74/0808
See application file for complete search history.

(56) References Cited

U.S. PATENT DOCUMENTS

| 2019/0045559 A1 | 2/2019 | Huang et al. | |
| 2019/0059106 A1* | 2/2019 | Zhang | H04W 16/14 |
| 2019/0123992 A1* | 4/2019 | Ly | H04L 43/065 |

(Continued)

FOREIGN PATENT DOCUMENTS

| CN | 108702283 A | 10/2018 |
| CN | 109167747 A | 1/2019 |
| CN | 109309955 A | 2/2019 |

OTHER PUBLICATIONS

PCT/CN2019/076156 English translation of the International Search Report dated Nov. 22, 2019, 2 pages.

(Continued)

*Primary Examiner* — Muthuswamy G Manoharan
(74) *Attorney, Agent, or Firm* — Cozen O'Connor

(57) ABSTRACT

The disclosure provides a method for configuring a synchronization signal and physical broadcast channel block (SSB). A terminal device obtains configuration information of an SSB of an undefined cell. The configuration information is used to configure at least one of two SSB patterns. The two SSB patterns includes a first SSB pattern and a second SSB pattern. The first SSB pattern is applicable to a beam-based listen before talk (LBT) reception scenario and the second SSB pattern is applicable to an omnidirectional LBT reception scenario.

11 Claims, 5 Drawing Sheets

(56) References Cited

U.S. PATENT DOCUMENTS

2019/0373635 A1\* 12/2019 Yang .................... H04B 7/0408
2020/0029287 A1\* 1/2020 Kim ...................... H04L 5/0007
2021/0045076 A1\* 2/2021 Tomeba .............. H04W 56/001

OTHER PUBLICATIONS

Indian Patent Application No. 202147042743, Office Action dated Mar. 25, 2022, 6 pages.
European Patent Application No. 19917182.8, Search and Opinion dated Feb. 16, 2022, 10 pages.
ZTE "Discussion on initial access and mobility for NR-U", 3GPP Draft; R1-1812436, Nov. 2018, 6 pages.

\* cited by examiner

METHOD AND APPARATUS FOR CONFIGURING SYNCHRONIZATION SIGNAL AND PHYSICAL BROADCAST CHANNEL BLOCK, SYSTEM AND STORAGE MEDIUM

CROSS-REFERENCE TO RELATED APPLICATION(S)

The present application is a US national phase application of International Patent Application No. PCT/CN2019/076156, filed on Feb. 26, 2019, the content of which is incorporated herein by reference in its entirety.

TECHNICAL FIELD

The disclosure relates to a field of mobile communication technologies, and more particularly, to a method and an apparatus for configuring a synchronization signal and physical broadcast channel (SS/PBCH) block (SSB), a system and a storage medium.

BACKGROUND

Generally, configuration of a synchronization signal and physical broadcast channel (SS/PBCH) block (SSB) of a defined cell in a random access procedure is fixed and even unique for simplifying a cell search process for user equipment (UE).

Regarding to a SSB configured to perform a measurement for an undefined cell, because the configuration of the SSB may be given through remaining minimum system information (RMSI), fixed configuration of the SSB is unnecessary.

SUMMARY

In one embodiment, a method for configuring an SSB is provided. The method includes:

obtaining configuration information of an SSB of an undefined cell by a terminal device, the configuration information being configured to configure at least one of two SSB patterns, the two SSB patterns including a first SSB pattern and a second SSB pattern;

in which, the first SSB pattern is applicable to a beam-based listen before talk (LBT) reception scenario and the second SSB pattern is applicable to an omnidirectional LBT reception scenario.

In one embodiment, a method for configuring an SSB is provided. The method includes:

sending configuration information of an SSB of an undefined cell by an access network device to a terminal device, the configuration information being configured to configure at least one of two SSB patterns, the two SSB patterns including a first SSB pattern and a second SSB pattern;

in which, the first SSB pattern is applicable to a beam-based listen before talk (LBT) reception scenario and the second SSB pattern is applicable to an omnidirectional LBT reception scenario.

In one embodiment, a terminal device is provided. The terminal device includes:

a processor;

a transceiver, connected to the processor; and a memory, configured to store instructions executable by the processor;

in which, the processor is configured to load and execute the instructions to implement a method for configuring an SSB executed by the terminal device as described above.

BRIEF DESCRIPTION OF THE DRAWINGS

In order to explain technical solutions in embodiments of the disclosure, the drawings described in the embodiments will be briefly introduced below. The drawings described in the following are only some embodiments of the disclosure. Those skilled in the art may obtain other drawings from these drawings without creative work.

DETAILED DESCRIPTION

In order to describe the purpose, technical solutions and advantages of the present invention, embodiments of the disclosure will be described below in connection with the accompanying drawings.

Third Generation Partnership Project (3GPP) has conducted the study of the NR-U, and it is required to support separate networking for cells corresponding to the NR-U. The "separate networking" refers to that all functions including such as initial access are done by NR-U cells without relying on NR cells. With the consideration of continuation of the NR-U design and the NR design, the NR design need to be inherited in the NR-U as much as possible.

Unlicensed spectrum design needs to comply with related regulations in major regions of the world, in which the most important are Listen Before Talk (LBT), occupied channel bandwidth (OCB), channel occupancy time (COT), etc.

The LBT is the most important mechanism coexisting with the WiFi. The LBT is to monitor an idle condition of a channel before transmission on the channel. When the channel is occupied, information at a given time cannot be sent. This newly raised problem (specific to the NR-U) brings new challenges and requirements for the NR-U design. Therefore, not all details of the NR design may be continued to use in the NR-U design.

A fixed mechanism can be adopted for the design of the SSB of a defined cell in a random access procedure and even a unique configuration can be adopted to simplify a cell search process for the UE. However, the communications system can also include SSBs that are configured to perform a measurement for an undefined cell. Since the configuration of these SSBs may be given by the RMSI, fixed configuration of these SSBs is unnecessary. Embodiments of the disclosure provide a method for configuring an SSB of an undefined cell, to provide good flexibility.

The "flexibility" refers to situations where there are two LBT schemes. One is beam-based scheme and the other is omnidirectional scheme. For the beam-based LBT, the LBT is performed within a gap between two SSBs. For the omnidirectional LBT, it is possible that there is no gap between two SSBs.

Figure 1:
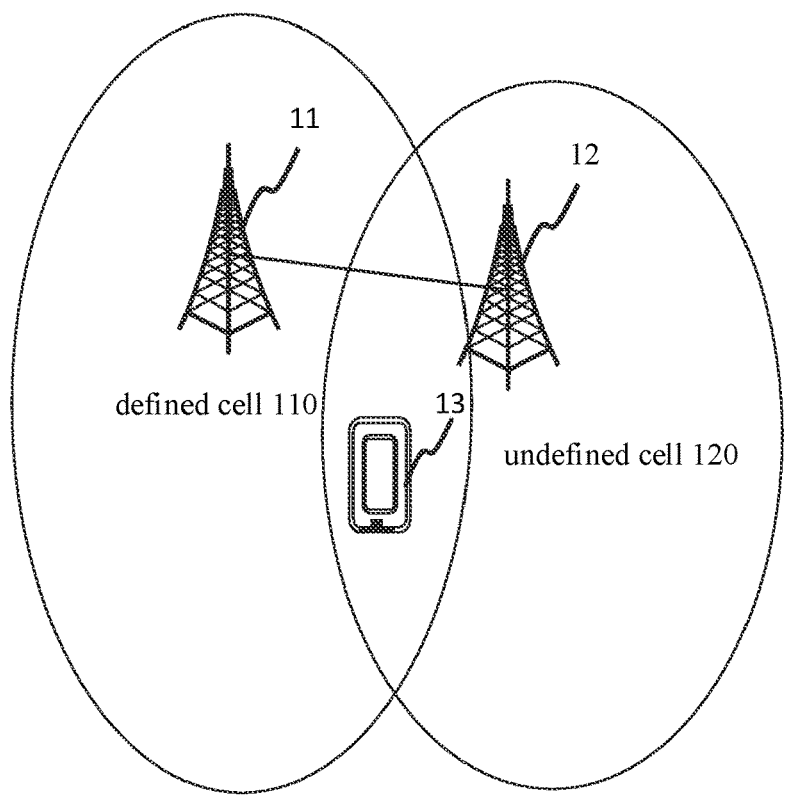
FIG. 1 is a schematic diagram illustrating an applicable communications system according to an example embodiment.

FIG. 1 is a block diagram illustrating a structure of a communications system according to an example embodiment. The communications system may be an NR-U system. A terminal device in the communications system can send and/or receive data by performing the LBT. The communications system may include an access network device 11, an access network device 12 and a terminal device 13.

The access network devices 11 and 12 may be base stations (BS). The base station is a device deployed in an access network for providing a radio communication function to the terminal device. The base station may include various forms of macro base stations, micro base stations, relay stations, access points, etc. In systems adopting different radio access technologies, names of the devices functioned as a base station function may be different. For example, in a long term evolution (LTE) system, the device is called eNode B or eNB. In a 5G NR system, the device is called gNodeB or gNB. With the evolution of the communications technology, the name of "base station" will be changed. For convenience of description, in embodiments of the disclosure, the above devices for providing the radio communication function for the terminal device are collectively called "access network device". The access network device 11 may provide defined cells for the terminal device 13. The access network device 12 may provide undefined cells for the terminal device 13.

The terminal device 13 may include various devices having the radio communication function, such as handheld devices, vehicle devices, wearable devices, computing devices or other processing devices connected to wireless modems, as well as various forms of UEs, mobile stations (MS), terminal devices, etc. For convenience of description, the above devices are collectively called "terminal device". The access network devices 11 and 12 can communicate with the terminal device 13 through some kind of air interface technology, for example, a Uu interface.

Figure 2:
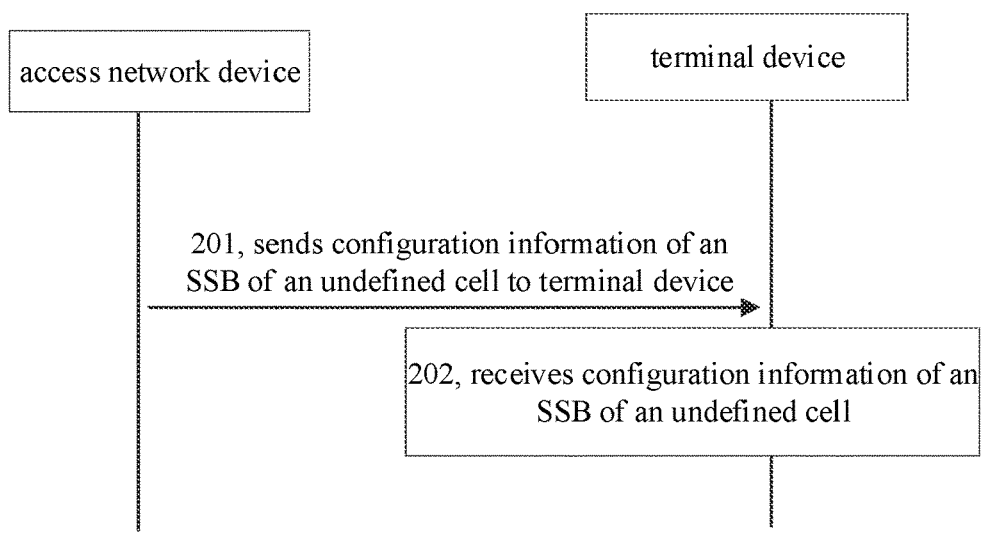
FIG. 2 is a flowchart illustrating a method for configuring an SSB according to an example embodiment.

FIG. 2 is a flowchart illustrating a method for configuring an SSB according to an example embodiment. The method may be executed by the above communications system. The method includes the following.

At block 201, the access network device sends configuration information of an SSB of an undefined cell to the terminal device.

The SSB refers to a synchronization signal block or a physical broadcast channel block. The SSB of the defined cell refers to an SSB provided with a control channel time-frequency position of the corresponding RMSI. The SSB of the undefined cell refers to an SSB that is provided with a control channel time-frequency position of the corresponding RMSI.

In embodiments of the disclosure, the SSB of the undefined cell carries information for configuring the terminal device to perform the measurement, and the SSB of the undefined cell does not have corresponding RMSI.

The configuration information is configured to configure at least one of two SSB patterns. The two SSB patterns include a first SSB pattern and a second SSB pattern.

The first SSB pattern is applicable to a beam-based LBT reception scenario. The second SSB pattern is applicable to an omnidirectional LBT reception scenario.

At block 202, the terminal device receives the configuration information of the SSB of the undefined cell.

With the method according to certain embodiments of the disclosure, the access network device sends the configuration information of the SSB of the undefined cell to the terminal device. The configuration information is configured to configure at least one of two SSB patterns. The two SSB patterns includes the first SSB pattern and the second SSB pattern. The first SSB pattern is applicable to the beam-based LBT reception scenario. The second SSB pattern is applicable to the omnidirectional LBT reception scenario. Therefore, the terminal may use different SSB patterns in different LBT reception scenarios when receiving the SSB of the undefined cell, thereby accurately receiving the SSB of the undefined cell to complete the measurement of the undefined cell.

In embodiments related to FIG. 2, in the first SSB pattern, there is a gap between adjacent two SSBs in the same subframe, and in the second SSB pattern, there is no gap between adjacent two SSBs in the same subframe. In some embodiments, the gap equals to 2 symbols.

Figure 3:
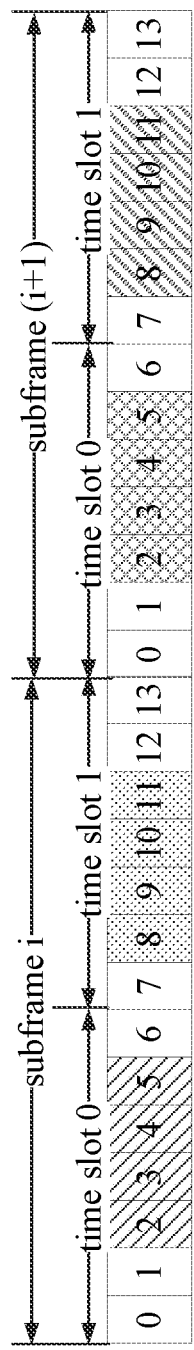
FIG. 3 is a schematic diagram illustrating a first SSB pattern according to an example embodiment.

In embodiments related to FIG. 2, as illustrated in FIG. 3, in the first SSB pattern, indexes of first symbols of candidate SSBs are $\{2, 8\}+14*n$. For a case where a carrier frequency is greater than 3 GHz and less than or equal to 6 GHz, $n=0, 1, 2, 3$. FIG. 3 illustrates 2 subframes, which is only an example. The subframe i includes 2 candidate SSBs. The candidate SSB in the time slot 0 occupies the second to the fifth symbols and the candidate SSB in the time slot 1 occupies the eighth to the eleventh symbols. There is a gap equaling two symbols between the two candidate SSBs. Similarly, the subframe (i+1) includes two candidate SSBs. The candidate SSB in the time slot 0 occupies the second to the fifth symbols and the candidate SSB in the time slot 1 occupies the eighth to the eleventh symbols. There is a gap equaling two symbols between the two candidate SSBs.

Figure 4:
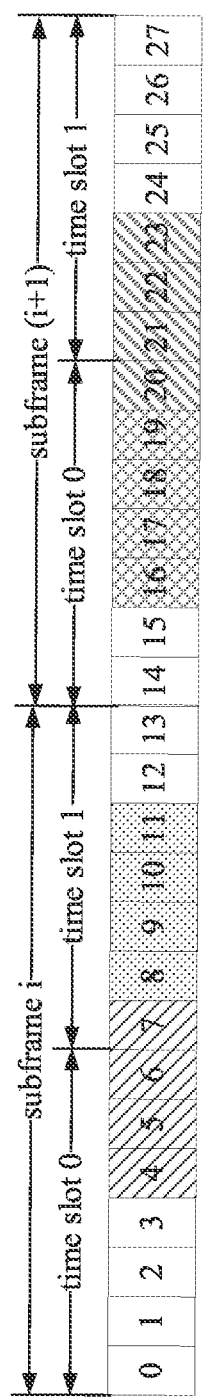
FIG. 4 is a schematic diagram illustrating a second SSB pattern according to an example embodiment.

In embodiments related to FIG. 2, as illustrated in FIG. 4, in the second SSB pattern, the indexes of the first symbols of the candidate SSBs are $\{4, 8, 16, 20\}+28*n$. For a case where a carrier frequency is greater than 3 GHz and less than or equal to 6 GHz, $n=0, 1$. The subframe i includes 2 candidate SSBs. The candidate SSB in the time slot 0 occupies the fourth to the seventh symbols and the candidate SSB in the time slot 1 occupies the eighth to the eleventh symbols. There is no gap between the two candidate SSBs. The subframe (i+1) includes 2 candidate SSBs. The candidate SSB in the time slot 0 occupies the sixteenth to the nineteenth symbols and the candidate SSB in the time slot 1 occupies the 20th to the 23rd symbols. There is no gap between the two candidate SSBs.

In certain embodiments, the above gap may equal 1 symbol, 3 symbols, 4 symbols, etc.

In embodiment related to FIG. 2, the configuration information is further configured to configure at least one of two sub-carrier spacings. The two sub-carrier spacings include a first sub-carrier spacing and a second sub-carrier spacing.

Four combinations can be formed by the two SSB patterns and the two sub-carrier spacings as follows: the first sub-carrier spacing and the first SSB pattern; the first sub-carrier spacing and the second SSB pattern; the second sub-carrier spacing and the first SSB pattern; the second sub-carrier spacing and the second SSB pattern.

In some embodiments, the first sub-carrier spacing is 15 kHZ, and the second sub-carrier spacing is 30 kHZ.

Figure 5:
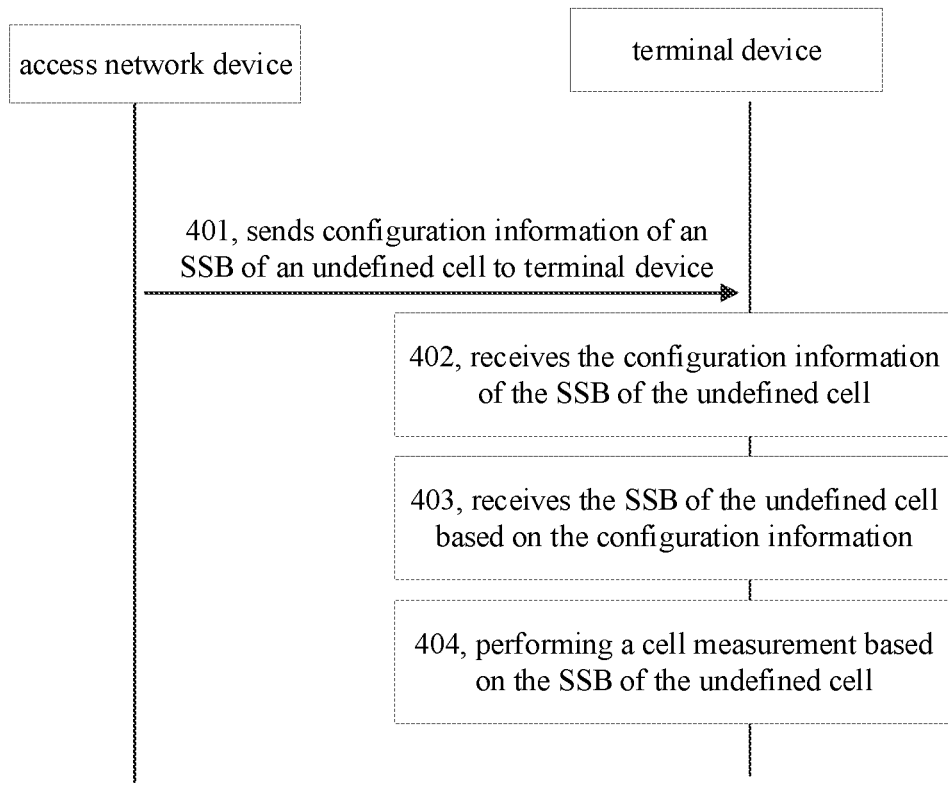
FIG. 5 is a flowchart illustrating a method for configuring an SSB according to another example embodiment.

In some embodiments based on the above embodiments, FIG. 5 is a flowchart illustrating a method for configuring an SSB according to another example embodiment. The method may be executed by the above communications system. The method includes the following.

At block 501, the access network device sends configuration information of the SSB of the undefined cell to the terminal device.

In a possible implementation, the access network device generates the configuration information of the SSB of the undefined cell based on a sending manner of the SSB of the undefined cell. For example, when the SSB of the undefined cell adopts a beam-based sending manner, first configuration information is generated. The first configuration information is configured to configure the terminal device with the first SSB pattern. When the SSB of the undefined cell adopts an omnidirectional sending manner, second configuration information is generated. The second configuration information is configured to configure the terminal device with the second SSB pattern.

In another possible implementation, the access network device may be further configured to configure the terminal device with both the two SSB patterns and instruct the terminal device to use a corresponding SSB pattern with a subsequent signaling. In still another possible implementation, the terminal device itself can determine which SSB pattern is used. The above is not limited in the disclosure.

The block 501 may be implemented by any one of the following.

1. The access network device sends RMSI of the defined cell to the terminal device. The RMSI carries the configuration information of the SSB of the undefined cell.

2. The access network device sends a high-layer signaling to the terminal device. The high-layer signaling carries the configuration information of the SSB of the undefined cell.

The high-layer signaling refers to a signaling generated by a protocol layer above the physical layer.

3. The access network device sends a measurement configuration message to the terminal device. The measurement configuration message carries the configuration information of the SSB of the undefined cell.

At block 502, the terminal device obtains the configuration information of the SSB of the undefined cell.

Correspondingly, the block 502 may be implemented by any one of the following.

1. The terminal device receives the RMSI of the defined cell. The RMSI carries the configuration information of the SSB of the undefined cell.

2. The terminal device receives the high-layer signaling. The high-layer signaling carries the configuration information of the SSB of the undefined cell.

3. The terminal device receives a measurement control message. The measurement control message carries the configuration information of the SSB of the undefined cell.

The terminal device obtains the first SSB pattern or the second SSB pattern from the configuration information after receiving the configuration information.

At block 503, the terminal device receives the SSB of the undefined cell based on the configuration information.

In the beam-based LBT reception scenario, the terminal device receives the SSB of the undefined cell based on the first SSB pattern.

In the omnidirectional LBT reception scenario, the terminal device receives the SSB of the undefined cell based on the second SSB pattern.

At block 504, the terminal device performs a cell measurement based on the SSB of the undefined cell.

The terminal device obtains measurement-related information based on the SSB after obtaining the SSB of the undefined cell and performs the cell measurement based on the measurement-related information.

With the method according to the disclosure, the access network device configures the terminal device with the configuration information of the SSB of the undefined cell. The configuration information is configured to configure at least one of two SSB patterns. The two SSB patterns include the first SSB pattern and the second SSB pattern. The first SSB pattern is applicable to the beam-based LBT reception scenario. The second SSB pattern is applicable to the omnidirectional LBT reception scenario. Therefore, the terminal may use different SSB patterns in different LBT reception scenarios when receiving the SSB of the undefined cell, thereby accurately receiving the SSB of the undefined cell to complete the measurement of the undefined cell.

The following is apparatus embodiments of the disclosure. Details that are not described in the apparatus embodiments may have been described in the method embodiments.

Figure 6:
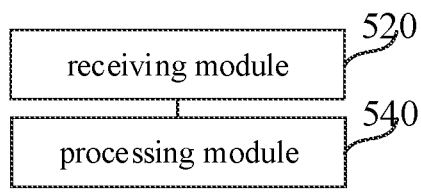
FIG. 6 is a block diagram illustrating an apparatus for configuring an SSB according to another example embodiment.

FIG. 6 is a flowchart illustrating an apparatus for configuring an SSB according to an example embodiment. The apparatus may be a part of a terminal device through software, hardware or a combination thereof. The apparatus may include a receiving module 620 and a processing module 640.

The receiving module 620 is configured to obtain configuration information of an SSB of an undefined cell. The configuration information is configured to configure at least one of two SSB patterns. The two SSB patterns include a first SSB pattern and a second SSB pattern.

The first SSB pattern is applicable to a beam-based LBT reception scenario and the second SSB pattern is applicable to an omnidirectional LBT reception scenario.

In some embodiments, the receiving module 620 is configured to receive RMSI of the defined cell. The RMSI carries the configuration information of the SSB of the undefined cell. In some embodiments, the receiving module 620 is configured to receive a high-layer signaling. The high-layer signaling carries the configuration information of the SSB of the undefined cell. In some embodiments, the receiving module 620 is configured to receive a measurement control message. The measurement control message carries the configuration information of the SSB of the undefined cell.

In some embodiments, the processing module 640 is configured to receive the configuration information of the SSB of the undefined cell based on configuration information and perform a cell measurement based on the SSB of the undefined cell.

Figure 7:
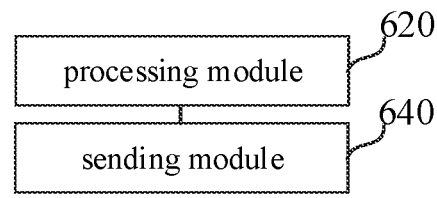
FIG. 7 is a block diagram illustrating an apparatus for configuring an SSB according to an example embodiment.

FIG. 7 is a flowchart illustrating an apparatus for configuring an SSB according to an example embodiment. The apparatus may be a part of a terminal device through software, hardware or a combination thereof. The apparatus includes a processing module 720 and a sending module 740.

The sending module 740 is configured to send configuration information of an SSB of an undefined cell to a terminal device. The configuration information is configured to configure at least one of two SSB patterns. The two SSB patterns include a first SSB pattern and a second SSB pattern.

The first SSB pattern is applicable to a beam-based LBT reception scenario and the second SSB pattern is applicable to an omnidirectional LBT reception scenario.

In some embodiments, the sending module 740 is configured to send RMSI of a defined cell to the terminal device. The RMSI carries the configuration information of the SSB of the undefined cell.

In some embodiments, the sending module 740 is configured to send a high-layer signaling to the terminal device.

The high-layer signaling carries the configuration information of the SSB of the undefined cell.

In some embodiments, the sending module 740 is configured to send a measurement control message to the terminal device. The measurement control message carries configuration information of the SSB of the undefined cell.

In embodiments related to FIG. 6 and/or FIG. 7, in the first SSB pattern, there is a gap between two adjacent SSBs in the same subframe. In the second SSB pattern, there is no gap between two adjacent SSBs in the same subframe.

In embodiments related to FIG. 6 and/or FIG. 7, in the first SSB pattern, indexes of first symbols of the candidate SSBs are $\{2, 8\}+14*n$. For a case where a carrier frequency is greater than 3 GHz and less than or equal to 6 GHz, n=0, 1, 2, 3. In the second SSB pattern, indexes of first symbols of the candidate SSBs are $\{4, 8, 16, 20\}+28*n$. For a case where the carrier frequency is greater than 3 GHz and less than or equal to 6 GHz, n=0, 1.

In embodiments related to FIG. 6 and/or FIG. 7, the configuration information is further configured to configure at least one of two sub-carrier spacings. The two sub-carrier spacings include a first sub-carrier spacing and a second sub-carrier spacing.

Four combinations are formed by the two two SSB patterns and the sub-carrier spacings as follows: the first sub-carrier spacings and the first SSB pattern; the first sub-carrier spacing and the second SSB pattern; the second sub-carrier spacing and the first SSB pattern; the second sub-carrier spacing and the second SSB pattern.

In embodiments related to FIG. 6 and/or FIG. 7, the first sub-carrier spacing is 15 kHZ and the second sub-carrier spacing is 30 kHZ.

Figure 8:
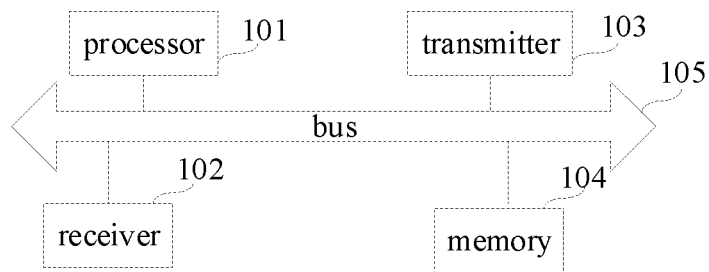
FIG. 8 is a block diagram illustrating a terminal according to an example embodiment.

FIG. 8 is a schematic diagram illustrating a structure of a terminal device according to an example embodiment. The terminal device includes a processor 101, a receiver 102, a transmitter 103, a memory 104 and a bus 105.

The processor 101 includes one or more processing cores. The processor 101 is configured to execute various functional applications and information processing by running software programs or modules.

The receiver 102 and the transmitter 103 may be implemented as a single communication component. The communication component may be a communication chip.

The memory 104 is communicatively coupled to the processor 101 through the bus 105.

The memory 104 is configured to store at least one instruction, and the processor 101 is configured to execute the at least one instruction to implement all blocks executed by the terminal device in the above embodiments.

In addition, the memory 104 may be implemented by any type of volatile or non-volatile storage devices or their combination. The volatile or non-volatile storage device includes, but not limited to, a magnetic disk, an optical disk, an electrically erasable programmable read-only memory (EEPROM), an erasable programmable read-only memory (EPROM), a static random access memory (SRAM), a read-only memory (ROM), a magnetic memory, a flash memory and a programmable read-only memory (PROM).

Figure 9:
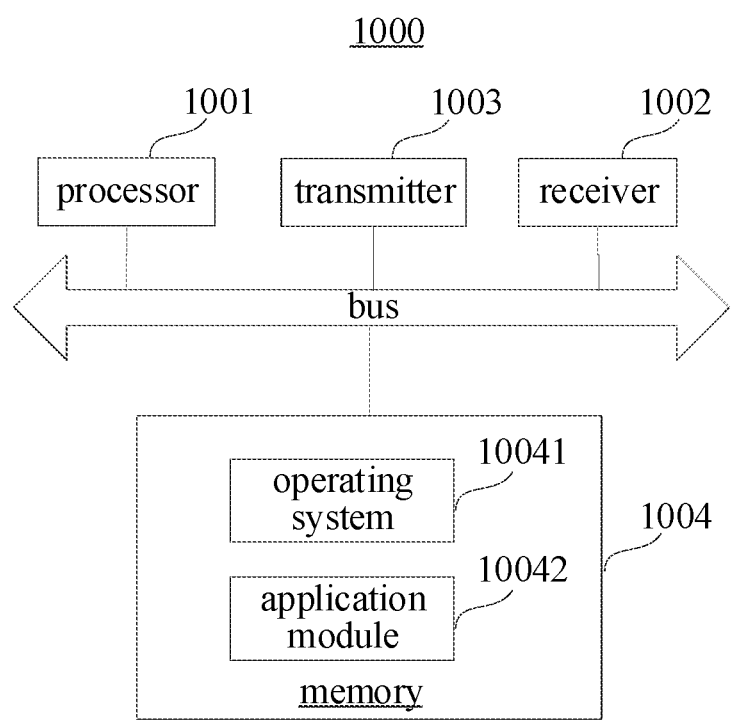
FIG. 9 is a block diagram illustrating an access network device according to an example embodiment.

FIG. 9 is a block diagram illustrating an access network device 1000 according to an example embodiment.

The access network device 1000 may include a processor 1001, a receiver 1002, a transmitter 1003 and a memory 1004. The receiver 1002, the transmitter 1003 and the memory 1004 are connected to the processor 1001 respectively through a bus.

The processor 1001 include one or more processing cores. The processor 1001 is configured to execute a transmission configuration method executed by the access network device and described in embodiments of the disclosure by running software programs or modules. The memory 1004 may be configured to store the software programs and the modules. In detail, the memory 1004 may be configured to store an operating system 10041 and application modules 10042 required by at least one function. The receiver 1002 is configured to receive communication data transmitted by other devices. The transmitter 1003 is configured to transmit communication data to other devices.

Example embodiments of the disclosure further provide a communications system. The system includes a terminal device and an access network device.

The terminal device includes an apparatus for configuring an SSB according to embodiments of FIG. 6. The access network device includes an apparatus for configuring an SSB according to embodiments of FIG. 7.

The terminal device is the terminal device according to embodiments of FIG. 8. The access network device is an access network device according to embodiments of FIG. 9.

Example embodiments of the disclosure further provide a computer readable storage medium. The computer readable storage medium has at least one instruction, at least one program, a code set and an instruction set stored thereon. The at least one instruction, the at least one program, the code set or the instruction set are loaded and executed by the processor to implement the blocks executed by the terminal device or the access network device in the method for configuring an SSB according to the above method embodiments.

Serial numbers of embodiments are only for the purpose of description and does not represent advantages or disadvantages of these embodiments.

Those skilled in the art may understand that all or part of the blocks in the above embodiments may be implemented by hardware, or by a program to instruct relevant hardware, in which the program may be stored in a computer readable storage medium which may be a read-only memory, a magnetic disk or an optical disk, etc.

The above are only some of the embodiments of the disclosure, and do not constitute the limitation of the disclosure. Any modification, equivalent replacement, improvement, etc., made within the spirit and principle of embodiments of the disclosure shall be included within the protection scope of embodiments of the disclosure.

What is claimed is:

1. A method for configuring a synchronization signal and physical broadcast channel block (SSB), comprising:
   obtaining configuration information of an SSB of an undefined cell by a terminal device, the configuration information being configured to configure at least one of two SSB patterns, the two SSB patterns comprising a first SSB pattern and a second SSB pattern;
   wherein the first SSB pattern is applicable to a beam-based listen before talk (LBT) reception scenario and the second SSB pattern is applicable to an omnidirectional LBT reception scenario;
   wherein, there is a gap between two adjacent SSBs in the same subframe of the first SSB pattern; and there is no gap between two adjacent SSBs in the same subframe of the second SSB pattern;
   wherein obtaining the configuration information of the SSB of the undefined cell by the terminal device comprises: receiving Remaining Minimum System Information (RMSI) of a defined cell by the terminal device, the RMSI carrying the configuration information of the SSB of the undefined cell;

wherein the configuration information is further used to configure at least one of two sub-carrier spacings, the two sub-carrier spacings comprising a first sub-carrier spacing and a second sub-carrier spacing; and
wherein four combinations formed by the two SSB patterns and the sub-carrier spacings comprise:
the first sub-carrier spacing and the first SSB pattern;
the first sub-carrier spacing and the second SSB pattern;
the second sub-carrier spacing and the first SSB pattern;
the second sub-carrier spacing and the second SSB pattern.

2. The method of claim 1, wherein,
in the first SSB pattern, indexes of first symbols of candidate SSBs are $\{2, 8\}+14*n$; for a carrier frequency greater than 3 GHz and less than or equal to 6 GHZ, n=0, 1, 2, 3; and
in the second SSB pattern, indexes of first symbols of candidate SSBs are $\{4, 8, 16, 20\}+28*n$; for a carrier frequency greater than 3 GHz and less than or equal to 6 GHz, n=0, 1.

3. The method of claim 1, wherein the first sub-carrier spacing is 15 kHZ and the second sub-carrier spacing is 30 KHZ.

4. The method of claim 1, wherein obtaining the configuration information of the SSB of the undefined cell by the terminal device comprises one of:
receiving a high-layer signaling by the terminal device, the high-layer signaling carrying the configuration information of the SSB of the undefined cell; or
receiving a measurement control message by the terminal device, the measurement control message carrying the configuration information of the SSB of the undefined cell.

5. A method for configuring a synchronization signal and physical broadcast channel block (SSB), comprising:
sending configuration information of an SSB of an undefined cell by an access network device to a terminal device, the configuration information being used to configure at least one of two SSB patterns, the two SSB patterns comprising a first SSB pattern and a second SSB pattern;
wherein the first SSB pattern is applicable to a beam-based listen before talk (LBT) reception scenario and the second SSB pattern is applicable to an omnidirectional LBT reception scenario;
wherein there is a gap between two adjacent SSBs in the same subframe of the first SSB pattern; and there is no gap between two adjacent SSBs in the same subframe of the second SSB pattern;
wherein sending the configuration information of the SSB of the undefined cell by the access network device to the terminal device comprises: sending Remaining Minimum System Information (RMSI) of a defined cell by the access network device to the terminal device, the RMSI carrying the configuration information of the SSB of the undefined cell;
wherein the configuration information is further used to configure at least one of two sub-carrier spacings, the two sub-carrier spacings comprising a first sub-carrier spacing and a second sub-carrier spacing; and
wherein four combinations formed by the two SSB patterns and the sub-carrier spacings comprise:
the first sub-carrier spacing and the first SSB pattern;
the first sub-carrier spacing and the second SSB pattern;
the second sub-carrier spacing and the first SSB pattern;
the second sub-carrier spacing and the second SSB pattern.

6. The method of claim 5, wherein,
in the first SSB pattern, indexes of first symbols of candidate SSBs are $\{2, 8\}+14*n$; for a carrier frequency greater than 3 GHz and less than or equal to 6 GHz, n=0, 1, 2, 3;
in the second SSB pattern, indexes of first symbols of candidate SSBs are $\{4, 8, 16, 20\}+28*n$; for a carrier frequency greater than 3 GHz and less than or equal to 6 GHz, n=0, 1.

7. The method of claim 5, wherein the first sub-carrier spacing is 15 kHZ and the second sub-carrier spacing is 30 KHZ.

8. The method of claim 5, wherein sending the configuration information of the SSB of the undefined cell by the access network device to the terminal device comprises one of:
sending a high-layer signaling by the access network device to the terminal device, the high-layer signaling carrying the configuration information of the SSB of the undefined cell; or
sending a measurement control message by the access network device to the terminal device, the measurement control message carrying the configuration information of the SSB of the undefined cell.

9. A terminal device, comprising:
a processor;
a transceiver, connected to the processor; and
a memory, configured to store instructions executable by the processor;
wherein when the instructions are loaded and executed by the processor, the processor is configured to:
obtain configuration information of an SSB of an undefined cell by a terminal device, the configuration information being used to configure at least one of two SSB patterns, the two SSB patterns comprising a first SSB pattern and a second SSB pattern;
wherein the first SSB pattern is applicable to a beam-based listen before talk (LBT) reception scenario and the second SSB pattern is applicable to an omnidirectional LBT reception scenario;
wherein there is a gap between two adjacent SSBs in the same subframe of the first SSB pattern; and there is no gap between two adjacent SSBs in the same subframe of the second SSB pattern;
wherein the processor is configured to receive Remaining Minimum System Information (RMSI) of a defined cell by the terminal device, the RMSI carrying the configuration information of the SSB of the undefined cell;
wherein the configuration information is further configured to configure at least one of two sub-carrier spacings, the two sub-carrier spacings comprising a first sub-carrier spacing and a second sub-carrier spacing; and
wherein four combinations formed by the two SSB patterns and the sub-carrier spacings comprise:
the first sub-carrier spacing and the first SSB pattern;
the first sub-carrier spacing and the second SSB pattern;
the second sub-carrier spacing and the first SSB pattern;
the second sub-carrier spacing and the second SSB pattern.

10. The terminal device of claim 9, wherein,
in the first SSB pattern, indexes of first symbols of candidate SSBs are $\{2, 8\}+14*n$; for a carrier frequency greater than 3 GHz and less than or equal to 6 GHz, n=0, 1, 2, 3; and in the second SSB pattern, indexes of first symbols of candidate SSBs are {4, 8, 16, 20}+28*n; for a carrier frequency greater than 3 GHz and less than or equal to 6 GHz, n=0, 1.

11. The terminal device of claim 9, wherein the processor is configured to execute one of:
receiving a high-layer signaling by the terminal device, the high-layer signaling carrying the configuration information of the SSB of the undefined cell; or
receiving a measurement control message by the terminal device, the measurement control message carrying the configuration information of the SSB of the undefined cell.

* * * * *